US008310843B2

(12) United States Patent
Kanatani et al.

(10) Patent No.: US 8,310,843 B2
(45) Date of Patent: Nov. 13, 2012

(54) TERMINAL SEALING APPARATUS

(75) Inventors: Yasukazu Kanatani, Tokyo (JP); Kazuhiro Fujiwara, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 75 days.

(21) Appl. No.: 12/226,341

(22) PCT Filed: Jan. 24, 2008

(86) PCT No.: PCT/JP2008/051460

§ 371 (c)(1), (2), (4) Date: Nov. 20, 2008

(87) PCT Pub. No.: WO2008/091016

PCT Pub. Date: Jul. 31, 2008

(65) Prior Publication Data

US 2009/0316379 A1 Dec. 24, 2009

(30) Foreign Application Priority Data

Jan. 25, 2007 (JP) ................................ 2007-015229

(51) Int. Cl.
*H02B 1/20* (2006.01)
*H05B 7/10* (2006.01)

(52) U.S. Cl. ......................... 361/826; 219/203; 219/219

(58) Field of Classification Search .................. 361/826; 219/219, 203

See application file for complete search history.

(56) References Cited

U.S. PATENT DOCUMENTS 2,687,448 A * 8/1954 Gulick et al. .................. 429/86
3,599,214 A * 8/1971 Altmayer ...................... 343/713
3,940,591 A * 2/1976 Ting .............................. 219/544
5,871,364 A * 2/1999 Shinchi et al. ................ 439/144
5,999,134 A * 12/1999 Dishart et al. ................ 343/713

(Continued)

FOREIGN PATENT DOCUMENTS

JP 5-33461 U 4/1993

(Continued)

OTHER PUBLICATIONS

International Preliminary Report on Patentability and Written Opinion of the International Searching Authority dated Jul. 28, 2009 (7 pages), issued in counterpart International application No. PCT/JP2008/051460.

*Primary Examiner* — Timothy Thompson
*Assistant Examiner* — Nathan Milakovich
(74) *Attorney, Agent, or Firm* — Holtz, Holtz, Goodman & Chick, PC

(57) ABSTRACT

There is provided a terminal sealing device that can realize easy change of a protective cover, reduce the number of components used, and be efficiently placed in a small space. A power supply terminal sealing device 10 includes a molded thermoplastic resin member 11 that seals a power supply terminal 13 provided on a surface of a glass plate 16, and a locking hole 12 formed integrally with the molded thermoplastic resin member 11, and the locking hole 12 engages a protective cover 18 that houses the molded thermoplastic resin member 11.

5 Claims, 5 Drawing Sheets

U.S. PATENT DOCUMENTS

| | | | | |
|---|---|---|---|---|
| 6,103,999 | A * | 8/2000 | Nishio et al. | 219/203 |
| 6,152,785 | A * | 11/2000 | Haller et al. | 439/766 |
| 6,307,515 | B1 * | 10/2001 | Sauer et al. | 343/713 |
| 6,316,140 | B1 * | 11/2001 | Hatazawa et al. | 429/163 |
| 7,081,589 | B1 * | 7/2006 | Advey et al. | 174/78 |
| 7,134,201 | B2 * | 11/2006 | Ackerman et al. | 29/857 |
| 7,223,939 | B2 * | 5/2007 | Hoepfner et al. | 219/203 |
| 7,663,561 | B2 * | 2/2010 | Hisaeda | 343/713 |
| 2006/0121773 | A1 * | 6/2006 | Ichikawa et al. | 439/408 |
| 2007/0029301 | A1 * | 2/2007 | Tokiwa et al. | 219/219 |

FOREIGN PATENT DOCUMENTS

| | | | |
|---|---|---|---|
| JP | 11204164 | A * | 7/1999 |
| JP | 2000320244 | A * | 11/2000 |
| JP | 2001298206 | A * | 10/2001 |
| JP | 2004-103272 | A | 4/2004 |
| JP | 2004-111435 | A | 4/2004 |
| JP | 2006-261065 | A | 9/2006 |
| WO | WO 2006100945 | A1 * | 9/2006 |

* cited by examiner

TERMINAL SEALING APPARATUS

This application is a U.S. National Phase Application under 35 USC 371 of International Application PCT/JP2008/051460 filed Jan. 24, 2008.

TECHNICAL FIELD

The present invention relates to a terminal sealing device, and more particularly, to a terminal sealing device that seals a terminal provided on a glass plate.

BACKGROUND ART

Resin has been often used for bonding or sealing a component, for example, a terminal. An example of bonding a terminal with resin includes a ground terminal holder in which a bonding portion between a harness and a ground terminal is covered with thermoplastic resin (for example, see Japanese Laid-Open Patent Publication (Kokai) No. 2006-261065). Also, an example of sealing a terminal with resin includes a mold type electronic component in which an electronic component having a terminal is integrally sealed with epoxy resin (for example, see Japanese Laid-Open Patent Publication (Kokai) No. 2004-111435).

When a power supply terminal provided on a glass plate for an automobile is sealed with a molded resin member, a protective cover is placed on the molded resin member for improving appearance and preventing cracking or moisture absorption of the resin member. Methods of placing the protective cover include a method of directly bonding the protective cover on the resin member, or a method of securing the protective cover to a bracket provided on a glass plate surface around the resin member.

However, directly bonding the protective cover on the molded resin member prevents the protective cover from being easily changed when the protective cover is injured or damaged. Also, securing the protective cover with the bracket requires a space for placing the bracket on the glass plate surface, and increases the number of components used, thereby increasing cost in production of a terminal sealing device.

The present invention is achieved in view of the above described problems. The present invention has an object to provide a terminal sealing device that can realize easy change of a protective cover, reduce the number of components used, and be efficiently placed in a small space.

DISCLOSURE OF THE INVENTION

To achieve the above described object, according to the present invention, there is provided a terminal sealing device that includes a body of molded resin, and seals at least one terminal provided on a substrate surface, wherein the device includes at least one engaging portion formed integrally with the body, and the engaging portion engages a container housing the body.

In the present invention, it is preferable that the engaging portion has a recess, the container has a projection, and the recess engages the projection.

In the present invention, it is preferable that the engaging portion has a projection, the container has a recess, and the projection engages the recess.

In the present invention, it is preferable that the substrate is a glass plate for an automobile.

In the present invention, it is preferable that the resin is thermoplastic resin or heat-curable resin.

BEST MODE FOR CARRYING OUT THE INVENTION

Now, an embodiment of the present invention will be described with reference to the drawings.

First, a terminal sealing device according to the embodiment of the present invention will be described.

Figure 1:
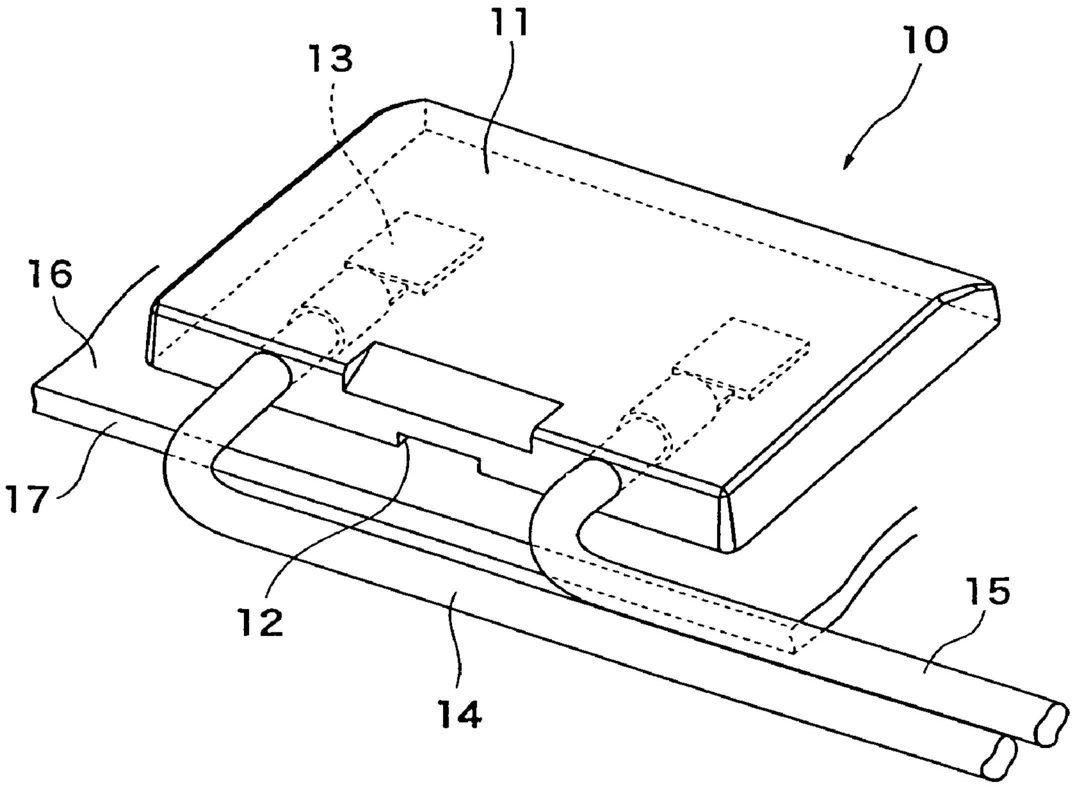
FIG. 1 is a schematic perspective view of a configuration of a power supply terminal sealing device as a terminal sealing device according to an embodiment of the present invention.
Figure 2:
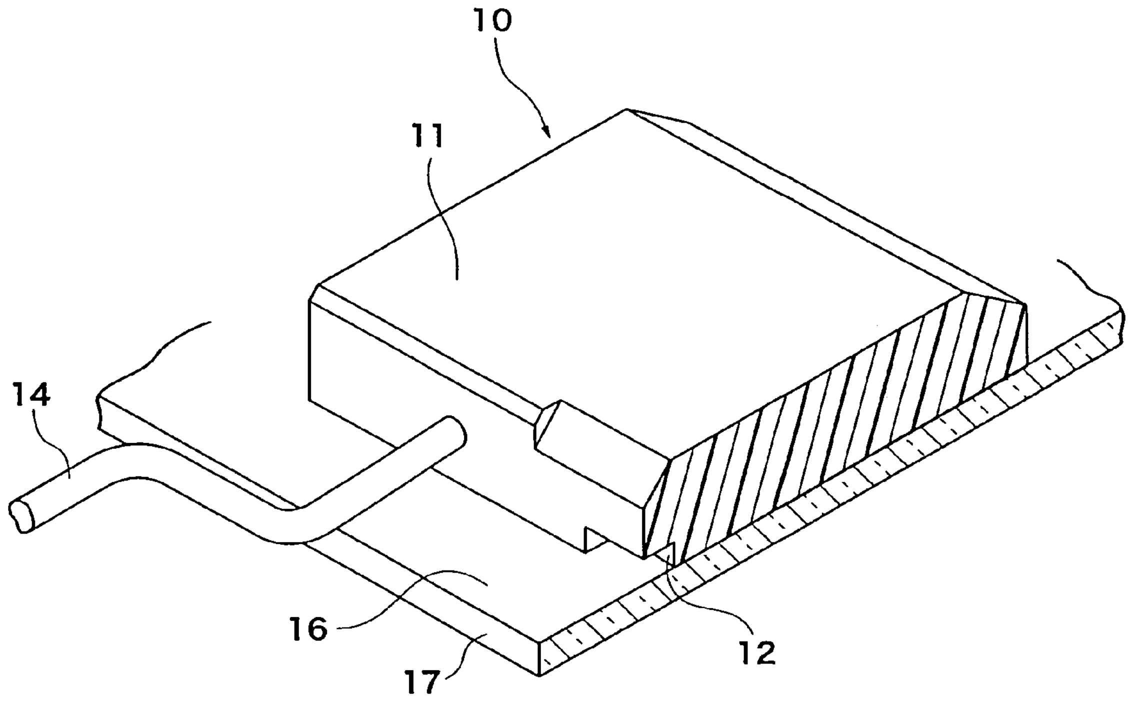
FIG. 2 is a schematic perspective view of a sectional configuration of the power supply terminal sealing device in FIG. 1.

FIG. 1 is a schematic perspective view of a configuration of a power supply terminal sealing device as a terminal sealing device according to the present embodiment. FIG. 2 is a schematic perspective view of a sectional configuration of the power supply terminal sealing device in FIG. 1.

In FIGS. 1 and 2, a power supply terminal sealing device 10 (terminal sealing device) includes a molded thermoplastic resin member 11 (body) molded by a mold 30 described later, and a locking hole 12 (engaging portion) formed integrally with the molded thermoplastic resin member 11. The molded thermoplastic resin member 11 has a substantially rectangular parallelepiped shape, and is placed on a surface of a glass plate 16 (substrate) for an automobile so that a longitudinal side surface is parallel to an end 17 of the glass plate 16. In a middle portion of the side surface of the molded thermoplastic resin member 11 along the end 17, the locking hole 12 of a substantially rectangular parallelepiped shape is formed in parallel with the glass plate 16 and perpendicularly to the side surface along the end 17. One side surface of the locking hole 12 is formed by the surface of the glass plate 16. Specifically, the locking hole 12 is formed in a lower part in FIG. 2 in the side surface of the molded thermoplastic resin member 11 along the end 17. Edges of the molded thermoplastic resin member 11 that do not abut the glass plate 16 are chamfered. Power supply terminals 13 sealed with the molded thermoplastic resin member 11 are electrically connected to harnesses 14 and 15 and provided on the surface of the glass plate 16 near the end 17.

Figure 3:
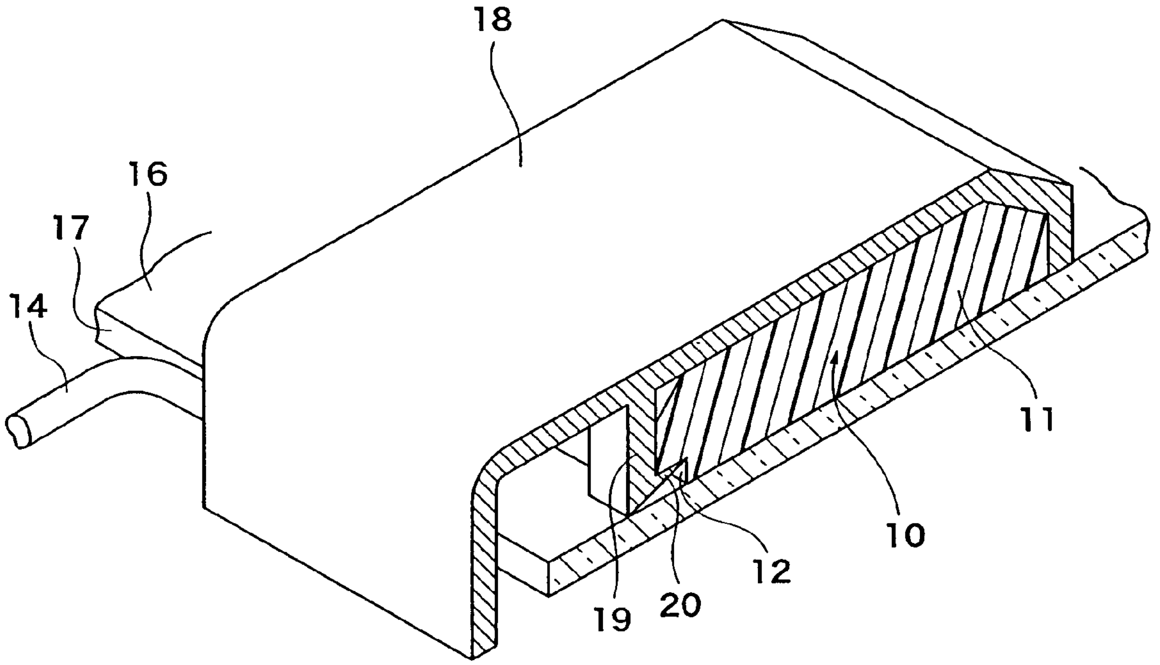
FIG. 3 is a schematic perspective view of a sectional configuration in a state where a protective cover is provided on the power supply terminal sealing device in FIG. 1.

FIG. 3 is a schematic perspective view of a sectional configuration in a state where a protective cover is provided on the power supply terminal sealing device in FIG. 1.

In FIG. 3, a protective cover 18 (container) has a substantially box shape with one open surface, and the molded thermoplastic resin member 11 is housed in an inner space of the box-shaped protective cover 18. On a bottom surface facing an opening inside the box-shaped protective cover 18, a locking portion 19 (engaging portion) is provided protruding vertically from the bottom surface toward the opening. A tip 20 of the locking portion 19 has a hook shape protruding perpendicularly to the locking portion 19 and toward the inner space of the protective cover 18 housing the molded thermoplastic resin member 11.

An amount of projection of the locking portion 19 from the bottom surface is substantially the same as a thickness of the molded thermoplastic resin member 11 in a vertical direction in FIG. 3. Thus, when the protective cover 18 houses the molded thermoplastic resin member 11 in the inner space thereof, the tip 20 faces the locking hole 12. An amount of projection of the tip 20 from the locking portion 19 is substantially the same as a depth of the locking hole 12 (a dimension in a direction perpendicular to the surface along the end 17), and thus the tip 20 facing the locking hole 12 is housed in the locking hole 12. As a result, the tip 20 engages the locking hole 12.

When the protective cover 18 is mounted to the molded thermoplastic resin member 11, the harness 14 is routed along a gap between the protective cover 18 and the glass plate 16 out of the protective cover 18. The harness 15 is similarly routed, though not shown.

As described above, when the protective cover 18 houses the molded thermoplastic resin member 11, the locking hole 12 engages the tip 20 of the locking portion 19, thereby allowing the protective cover 18 to be reliably secured to the power supply terminal sealing device 10.

The power supply terminal sealing device 10 according to the present embodiment includes the molded thermoplastic resin member 11 that seals the power supply terminal 13 provided on the surface of the glass plate 16, and the locking hole 12 formed integrally with the molded thermoplastic resin member 11, and the locking hole 12 engages the tip 20 of the locking portion 19 provided on the protective cover 18 that houses the molded thermoplastic resin member 11. Thus, when the power supply terminal sealing device 10 is protected by the protective cover 18, there is no need for directly bonding the protective cover 18 to the molded thermoplastic resin member 11, thereby facilitating changing the protective cover 18. Also, there is no need for providing a bracket for engaging the protective cover 18 on the surface of the glass plate 16 around the molded thermoplastic resin member 11, thereby reducing the number of components used in the power supply terminal sealing device 10. Further, there is no need for ensuring a space for providing the bracket, thereby allowing the power supply terminal sealing device 10 to be efficiently placed in a small space.

Figure 4:
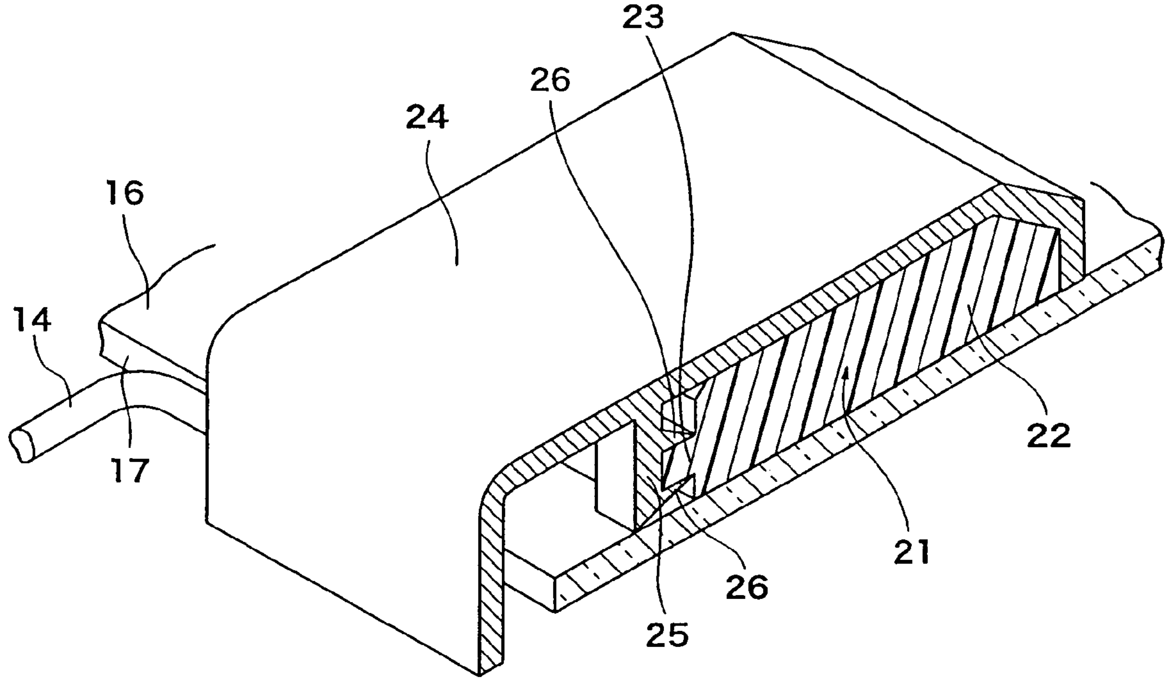
FIG. 4 is a schematic perspective view of a sectional configuration in a state where a variant of the protective cover of is provided on a variant of the power supply terminal sealing device in FIG. 1.

In the above described embodiment, the molded thermoplastic resin member 11 has the recessed locking hole 12 as an engaging portion, and the protective cover 18 has the locking portion 19 with the protruding tip 20. However, as shown in FIG. 4, a molded thermoplastic resin member 22 of a power supply terminal sealing device 21 may have a protruding engaging projection 23 (engaging portion), and a protective cover 24 may have an engaging portion 25 with a recessed tip 26 protruding toward an inner space housing the molded thermoplastic resin member 22, thereby allowing the protective cover 24 to be reliably secured to the power supply terminal sealing device 21.

Next, a production method of the terminal sealing device according to the present embodiment will be described.

FIGS. 5A to 5D are process diagrams showing a production process of the power supply terminal sealing device as a terminal sealing device according to the present embodiment.

Figure 5A:
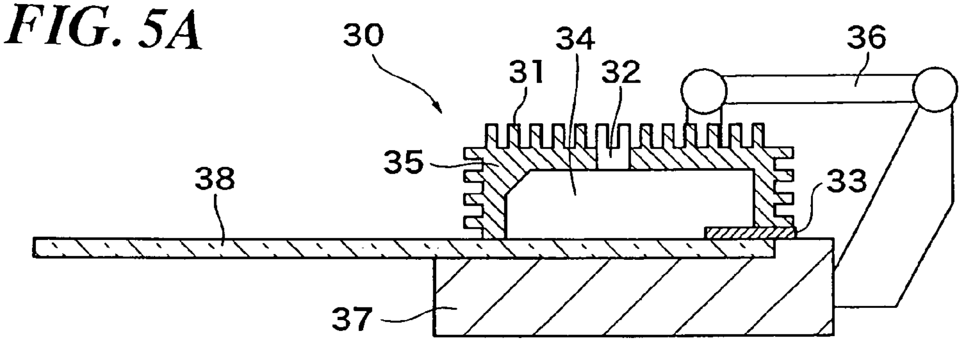
FIGS. 5A to 5D are process diagrams showing a production process of the power supply terminal sealing device as a terminal sealing device according to the present embodiment.

A mold 30 used in this production method includes, as shown in FIG. 5A, a body 35, radiator fins 31, an inlet 32, an insert 33, a drive arm 36, and an installation base 37. The body 35 has a substantially box shape with one open surface, and in a lower part of a side surface (right side surface in FIG. 5A) of the box-shaped body 35, a space for inserting the insert 33 is provided. The insert 33 is inserted through the space in parallel with a glass plate 38, and one surface of the insert 33 is in contact with the glass plate 38. An inner space 34 formed by the body 35 and the insert 33 inserted into the space of the body 35 has an inverted shape of the molded thermoplastic resin member 11. Each of the radiator fins 31 is formed in an irregular shape on an outer side of the body 35, and radiates heat from the mold 30 heated by hot melted thermoplastic resin being injected into the inner space 34. The inlet 32 is formed substantially in the middle of an upper surface of the body 35, and the hot melted thermoplastic resin is injected through the inlet 32 into the inner space 34. The drive arm 36 is secured to the installation base 37, and supports the body 35 separatably from the installation base 37. The glass plate 38 placed on an upper surface of the installation base 37 is pressed against the upper surface of the installation base 37 by the body 35 and the installation base 37.

Figure 5B:
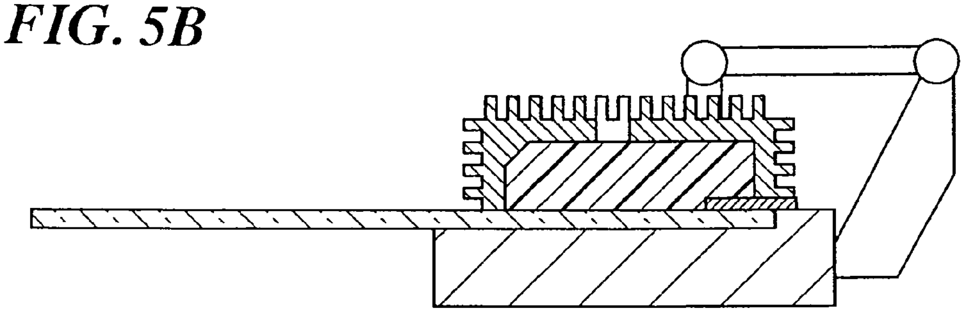
Figure 5C:
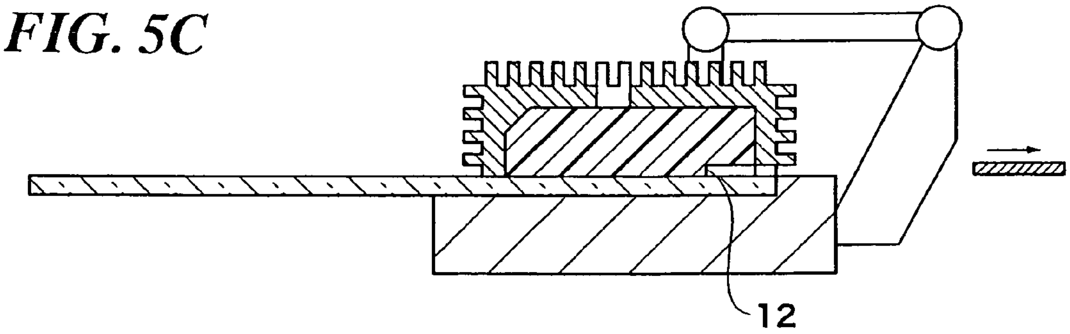
Figure 5D:
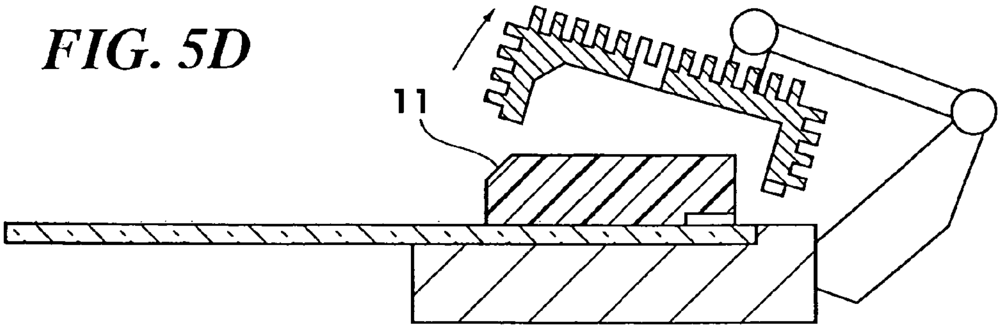

In this production method, first, the glass plate 38 provided with a power supply terminal (not shown) is placed on the upper surface of the installation base 37, the glass plate 38 is pressed against the upper surface of the installation base 37 by the body 35 and the installation base 37, and the insert 33 is inserted into the body 35 (FIG. 5A). Then, melted thermoplastic resin is poured through the inlet 32 into the mold 30 (FIG. 5B). After the thermoplastic resin is cooled and cured, the insert 33 is removed from the body 35 (FIG. 5C). Then, the drive arm 34 is driven to release the molded thermoplastic resin member 11 from the mold 30 (FIG. 5D).

According to the above described process, the thermoplastic resin is melted, poured into the mold 30, and further cooled, thereby allowing the molded thermoplastic resin member 11 and the locking hole 12 to be easily and integrally formed. In this production method, in FIG. 5A, the glass plate 38 placed on the upper surface of the installation base 37 is pressed against the upper surface of the installation base 37 by the body 35, and then the insert 33 is inserted into the body 35. However, for example, it may be allowed that the insert 33 is inserted into the body 35, then the glass plate 38 is placed on the upper surface of the installation base 37, and the glass plate 38 is pressed against the upper surface of the installation base 37 by the body 35. Further, in this production method, the insertion of the insert 33 (FIG. 5A) or the removal of the insert 33 (FIG. 5C) may be performed by automatically sliding the insert 33.

The thermoplastic resin used in the present embodiment can be molded at lower pressure than other resin, thereby placing a low stress load on the glass plate, and preventing damage to the glass plate in a production process of the terminal sealing device. Setting a temperature of the melted thermoplastic resin when injected into the mold to 180° C. to 210° C. can further reduce the stress load on the glass plate. It should be noted that the thermoplastic resin used is preferably poly amide resin or polyester resin.

In the process in FIG. 5A, the surface of the glass plate 38 is preferably cleaned with a solvent such as alcohol and primer coated with a silane coupling agent for improving a bonding property between the glass plate 38 and the thermoplastic resin. Further, inside surfaces of the mold 30 are coated with a fluorine-based or silicon-based mold release agent for improving a mold releasing property in releasing the cooled and cured thermoplastic resin from the mold 30.

When heat-curable resin is used as resin for forming the body, heat-curable resin having fluidity is poured through the inlet 32 into the mold 30 at room temperature (about 20° C.), and the heat-curable resin is heated and cured and then cooled, thereby allowing a molded heat-curable resin member and a locking hole to be easily and integrally formed. It should be noted that heating temperature of the heat-curable resin is preferably 100° C. to 200° C., and the heat-curable resin used is preferably epoxy resin or silicon resin.

INDUSTRIAL APPLICABILITY

According to the present invention, the terminal sealing device includes a body of molded resin, seals at least one terminal provided on a substrate surface, and includes at least one engaging portion formed integrally with the body, and the engaging portion engages a container housing the body. Thus, when the terminal sealing device is protected by the container, there is no need for directly bonding the container to the body, thereby facilitating changing the container. Also, there is no need for providing a bracket for engaging the container on the substrate surface around the body, thereby reducing the number of components used in the terminal sealing device. Further, there is no need for ensuring a space for providing the bracket, thereby allowing the terminal sealing device to be efficiently placed in a small space.

According to the present invention, the engaging portion formed integrally with the body has a recess, the container has a projection, and the recess engages the projection, thereby allowing the container to be reliably secured to the terminal sealing device.

According to the present invention, the engaging portion formed integrally with the body has a projection, the container has a recess, and the projection engages the recess, thereby allowing the container to be reliably secured to the terminal sealing device According to the present invention, the resin for forming the body is thermoplastic resin or heat-curable resin. When the thermoplastic resin is used, the thermoplastic resin is melted, poured into a mold, and further cooled, thereby allowing the body and the engaging portion to be easily and integrally formed. When the heat-curable resin is used, the heat-curable resin is poured into a mold, heated, and then further cooled, thereby allowing the body and the engaging portion to be easily and integrally formed.

The invention claimed is:

1. A terminal sealing device comprising:

a body of molded resin, wherein the body entirely seals at least one terminal provided on a surface of a substrate and is bonded to the surface of the substrate; and at least one engaging portion formed integrally with said body when said body is molded, wherein said at least one engaging portion is configured to engage at least one engaging portion of a container to be located over said body to house said body;

wherein said body is configured to receive said container in a state in which said body is bonded to the surface of the substrate and has said engaging portion integrally formed therewith, such that the container is located over said body bonded to the substrate and said engaging portion of said container is paired and engaged with said engaging portion formed integrally with said body.

2. The terminal sealing device according to claim 1, wherein said engaging portion formed integrally with said body comprises a recess, said engaging portion of said container comprises a projection, and said recess engages said projection.

3. The terminal sealing device according to claim 1, wherein said engaging portion formed integrally with said body comprises a projection, said engaging portion of said container comprises a recess, and said projection engages said recess.

4. The terminal sealing device according to claim 1, wherein said substrate comprises a glass plate for an automobile.

5. The terminal sealing device according to claim 1, wherein said resin comprises thermoplastic resin or heat-curable resin.

* * * * *